United States Patent [19]

Shutterly

[11] 4,070,693
[45] Jan. 24, 1978

[54] SECURE TELEVISION TRANSMISSION SYSTEM

[75] Inventor: Harold B. Shutterly, Pittsburgh, Pa.

[73] Assignee: Westinghouse Electric Corporation, Pittsburgh, Pa.

[21] Appl. No.: 776,329

[22] Filed: Mar. 10, 1977

Related U.S. Application Data

[63] Continuation of Ser. No. 603,075, Aug. 8, 1975, abandoned.

[51] Int. Cl.² ............................................. H04N 1/44
[52] U.S. Cl. ................................. 358/123; 178/22; 179/1.5 S; 358/122
[58] Field of Search ................. 179/1.5 S; 325/32; 178/22, 113; 358/119, 120, 123, 259

[56] References Cited

U.S. PATENT DOCUMENTS

| | | | |
|---|---|---|---|
| 3,746,799 | 7/1973 | Gentges | 178/22 |
| 3,821,731 | 6/1974 | Levine | 340/324 AD |
| 3,830,966 | 8/1974 | Aldrich et al. | 358/261 |
| 3,919,462 | 11/1975 | Hartung et al. | 178/22 |
| 3,921,151 | 11/1975 | Guanella | 178/22 |
| 3,925,611 | 12/1975 | Dennis | 178/22 |
| 3,958,081 | 5/1976 | Ehrsam et al. | 178/22 |

Primary Examiner—S. C. Buczinski
Attorney, Agent, or Firm—J. B. Hinson

[57] ABSTRACT

A system for transmitting a secure television image is as disclosed. At the transmitter each line of the television image is digitized to generate a series of digital numbers representing the complete video line. The digital numbers representing the picture portion of each scan line are cyclically rotated by a random amount leaving the synchronizing portion unchanged. The digital numbers are converted to an analog signal which is filtered to generate a composite signal with the picture portion of each line cyclically shifted by a random amount. At the receiver the signal is digitized and the picture portion of each line is rotated to restore the picture portions of each line to their original position. The process of rotation is identical to that used at the transmitter except that the amount of rotation must be adjusted to restore all portions of the picture portion of the signal to their original position. The degree of security resulting from this system depends on the complexity of the system used to determine the random rotation of the individual scan lines.

3 Claims, 6 Drawing Figures

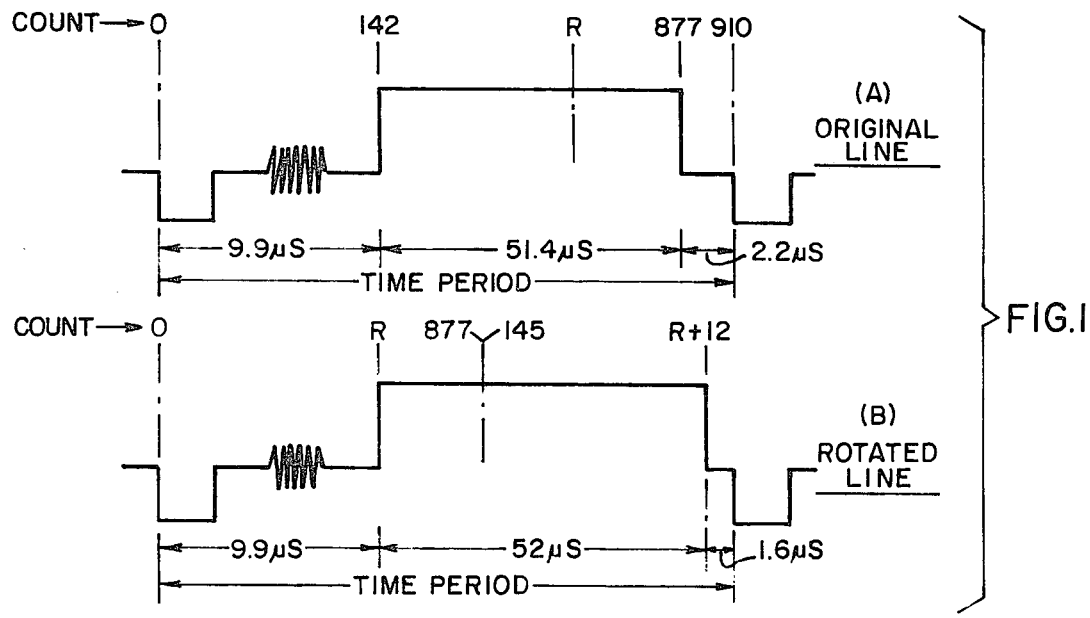
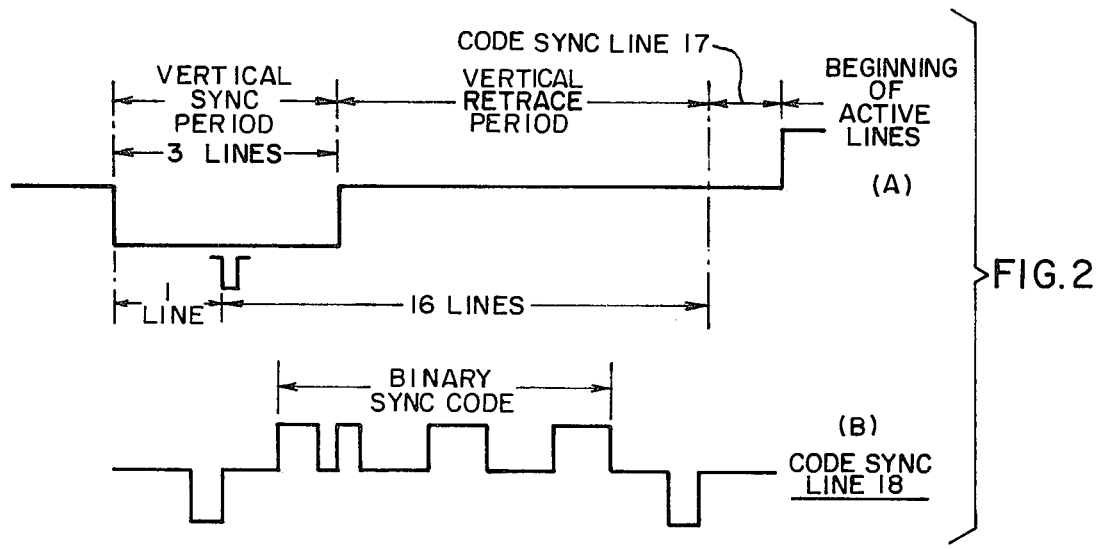
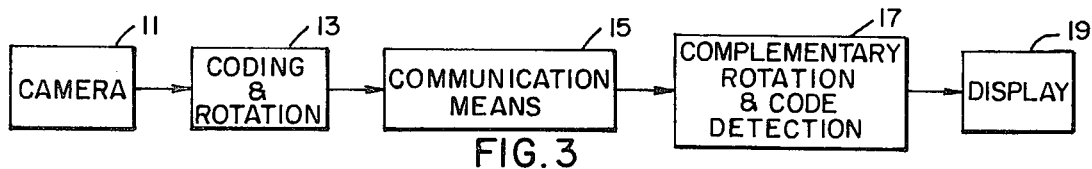

SECURE TELEVISION TRANSMISSION SYSTEM

This is a continuation of application Ser. No. 603,075, filed Aug. 8, 1975, now abandoned.

BACKGROUND OF THE INVENTION

The invention relates to secure communication systems and more particularly to secure television systems in which the picture portions of each scan line is rotated by a random amount.

SUMMARY OF THE INVENTION

The disclosed system provides a secure method of transmitting TV images by randomly rotating the picture portion of each scan line of the TV image. In the preferred embodiment of the invention, each scan line is digitized and the resulting digital numbes are sequentially stored in a random access digital memory. Random rotation is accomplished by sequentially reading first the data corresponding to the line sync signal and then the stored picture data beginning with an address which is randomly selected. For example, if 500 digital values were used to represent a line of video, 100 for the synchronizing portion and 400 for the picture portion, these values would be sequentially stored in a digital memory at addresses to 500. The next line of video would be similarly digitized and stored in addresses 1 to 500 in a second memory.

While the second line was being digitized and stored, the first line is randomly rotated. For example, rotation can be accomplished by reading the sync data from 1 to 100 and then beginning reading of the picture data at address 400 and sequentially reading from addresses 400 to 500 and then from 101 to 399. As the data is being read, each sample is converted to its analog equivalent and the result filtered to produce the rotated video information. The second line stored in the second memory is similarly rotated while the first memory is reloaded with a new line and the process is repeated for all active lines of the TV image. The point within the stored data at which reading begins is controlled by a random number generator.

At the receiver each scan line is similarly digitized and stored in a random access memory and rotated on readout. The stored picture data is read beginning at a location corresponding to the beginning of the picture information. The digital numbers are converted to an analog signal to recreate the original video information.

As in all systems utilizing random coding to generate a secure communication system, some information must be transmitted in order to synchronize the systems. In this system the necessary synchronizing information is transmitted during the vertical retrace period. Basically, this information gives the starting point for the random numbers generator utilized at the transmitting site for randomly rotating the video information. The receiving system includes a matching random number generator. The synchronizing code is used to set the starting point of the random number generator located at the receiver to the starting point of the generator located at the transmitter. Once this synchronization has been accomplished, all the information needed to decode the scrambled signal at the receiver is available.

In alternate embodiments the digitized picture information at the transmitter and the receiver could be stored in a shift register with appropriate provisions being made for shifting and recirculating this register to accomplish the desired rotation of the information. It should also be possible to build all analog systems if suitable analog memories were available at a reasonable cost.

DESCRIPTION OF THE DRAWINGS

FIGS. 1A and 1B is a diagram illustrating the concepts of rotating a single line of video information;

FIG. 2 is a diagram illustrating the technique utilized to transmit the synchronizing information;

FIG. 3 is a block diagram of the basic concept of the secure TV system;

DETAILED DESCRIPTION

Figure 4:
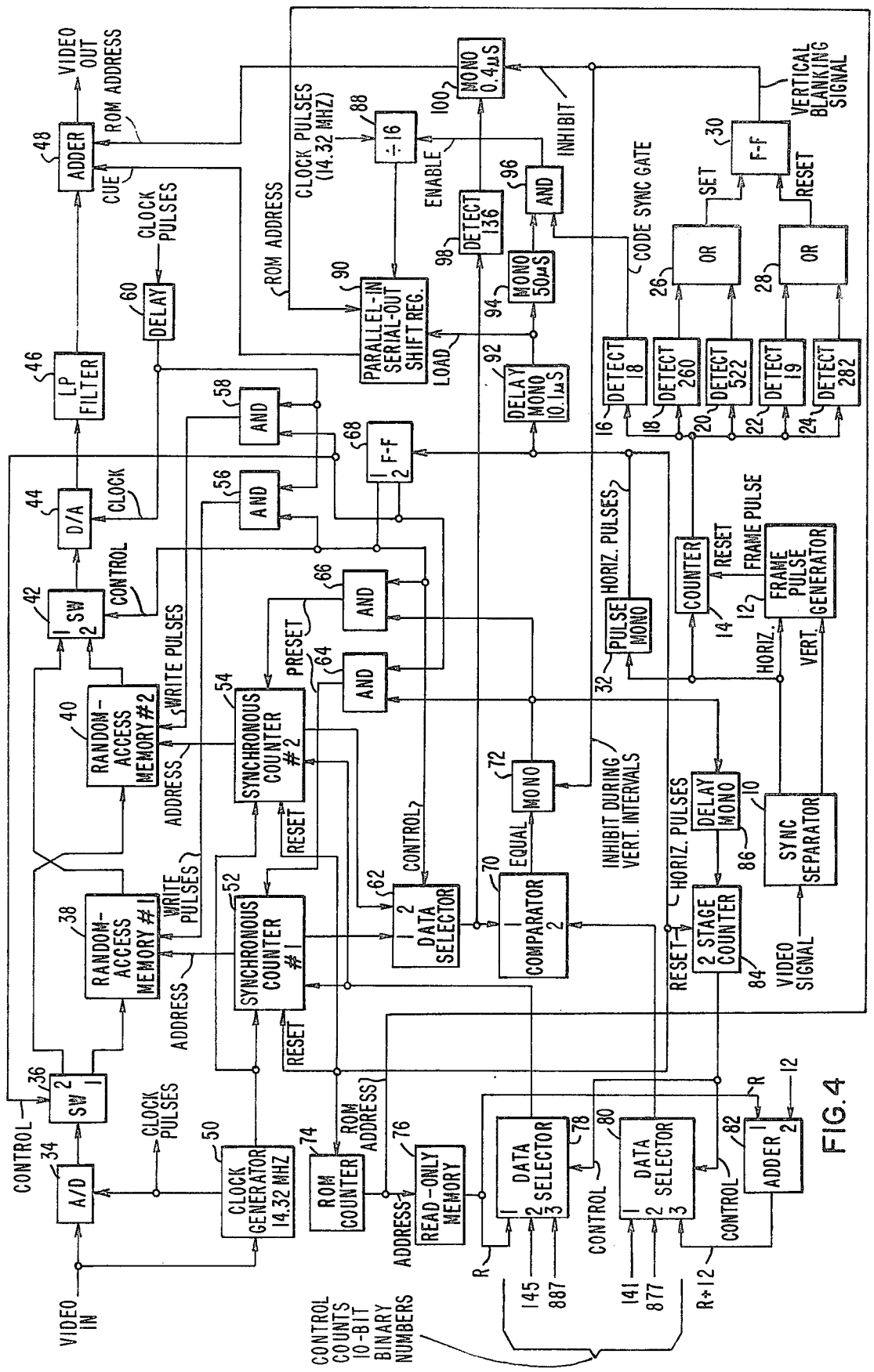
FIG. 4 is a block diagram of the coding portion of the system.

The concept of the random line rotation video scrambling technique is illustrated in FIG. 1. FIG. 1A illustrates one line of a conventional television signal. The time periods associated with the scan line are indicated by the numbers below the line. The numbers above the line correspond to the number of periods of a 14.32 megacycle oscillator starting with zero at the leading edge of the horizontal sync pulse. An oscillator at this frequency, which is four times the color sub-carrier frequency, is used as a signal which determines the sample rate when the signal is digitized. The active (picture) portion of the television line is assumed to be 51.4 microseconds and to lie therefore between the counts 142 and 877. The count R is a random number, random count, typically in the range of 150 to 870.

FIG. 1B shows the television line after rotation. The portion of the active line between R and 877 has been shifted to the front of the active line. The beginning of the active line starting with count 145 has been shifted around cyclically and follows count 877. Twelve counts following count R are repeated at both the beginning of the rotated line and at the end of the rotated line. The purpose of the repeated counts is to eliminate transient errors at the receiver in the reconstruction of the original line. Transient errors occur at the beginning of the rotated line as it is received at the receiver because this portion of the line indicated by count R in the figure is not preceded by the video which had preceded it in the original line, FIG. 1A. The repeated counts at the end of the rotated line however are preceded by normal video content and, therefore, do not contain transient errors. The effect of transient errors is eliminated at the receiver by utilizing the video corresponding to the repeated counts at the end of the rotated line and eliminating the video corresponding to the first few counts at the beginning of the active line.

Repeating of twelve samples as is indicated in FIG. 1B increases the length of the active line from the 51.4 microseconds in FIG. 1A to 52 microseconds in FIG. 1B. To accommodate the twelve additional samples three samples at the beginning of the original line have been deleted in FIG. 1B and the duration of the front porch before the sync has been decreased from 2.2 microseconds to 1.6 microseconds. Since television pictures are always overscanned slightly in a television monitor deletion of samples at the beginning of the line cannot be observed and the size of the front porch of 1.6 microseconds is also quite adequate for normal operation.

The value of the count R varies randomly from line-to-line. Consequently, a method of synchronizing the receiver to the random variation of the R value is needed. FIG. 2 indicates the means for providing synchronization information to the receiver. FIG. 2A indicates the vertical sync and retrace periods of the even field of a television frame. The code sync information is provided in the last line of the vertical retrace period. The random counts which determine the value of R for each line are generated by a random sequence generator located at the transmitter. The purpose of the code sync data is to indicate to the receiver the position in this sequence at the beginning of each even field. The data is provided by means of a binary sync code as is indicated in FIG. 2.

FIG. 3 is a functional block diagram of the secure television system. Television camera 11 provides a standard NTSC signal to the coding and rotation device 13. The output of the coding and rotation device 13 is a scrambled television signal in standard format. This signal goes to communication means 15 which communicates the signal to a decoding device 17. This device descrambles the signal and provides a standard television signal to display monitor 19.

FIG. 4 is a detailed block diagram of the random line rotation scrambler. This corresponds to block 13 of FIG. 3. Timing information for the scrambler is derived from the input video signal. Sync separator 10 derives horizontal and vertical synchronizing pulses from the video signal which are applied to frame pulse generator 12. The frame pulse generator 12 produces a frame pulse at the beginning of the second line of each even field. The frame pulse is generated by frame pulse generator 12 by integrating the vertical sync pulses in a low pass filter which provides an output pulse one line after the leading edge of the vertical sync pulse. This pulse is combined with the horizontal sync pulse to produce a frame pulse at each even field. No pulse is produced by the vertical pulse in odd fields because the vertical pulse in odd fields is shifted by one-half a line period relative to the horizontal sync pulse. The horizontal pulse from sync separator 10 is also applied to counter 14 which is also reset by the frame pulse from frame pulse generator 12. Counter 14 thus provides a line count in each frame starting with zero at the second line of the vertical sync pulse in even fields. Detectors 18 and 20 detect the line count corresponding to the beginning of the odd field vertical interval and the even field vertical interval respectively. The outputs from these two detectors are coupled to the inputs of an OR gate 26, the output of which sets the flip-flop 30. The end of the odd field vertical interval and the even field vertical interval are detected by detectors 22 and 24. The outputs of these two detectors are applied to OR gate 28, the output of which resets flip-flop 30. The output of flip-flop 30 is a vertical blanking signal which is synchronized to the input video. The horizontal pulse from sync separator 10 is also coupled to the input of a monostable multivibrator 32. This circuit provides a horizontal reference pulse for the system. Clock generator 50 provides a 14.32 megahertz high frequency clock for the system. When the input video signal is a color television signal clock generator 50 is phase locked to the 3.58 megahertz color sub-carrier of the video signal. For a black and white signal, the oscillator is phase locked to the horizontal syncs.

Analog-to-digital converter 34 samples the input video signal at the high frequency clock rate and provides digital samples to switch 36. Switch 36 provides an output to either random access memory 38 or random access memory 40. It is switched at line rate by flip-flop 68 which is toggled by the horizontal reference pulse from the monostable multivibrator 32. Thus, each input video line is sampled and converted to digital form and stored in either random access memory 38 or random access 40. The outputs of the two random access memories are selected alternately by switch 42 which is driven in anti-phase from switch 36 by flip-flop 68. Thus, the output from whichever random access memory that is not being currently loaded with an input video line is coupled through switch 42 to the input of a digital-to-analog converter 44. This converter converts the digital samples into analog samples which are then provided to low pass filter 46 which smooths the signal producing a continuous signal to adder 48. Adder 48 is used to add the binary sync code illustrated in FIG. 2B to line 17, the last line of vertical blanking interval in the even field. Adder 48 also has provision to add a cue pulse just prior to the beginning of the active line in each rotated line. This cue pulse can be used at a receiver as a timing reference in the same way that a horizontal sync pulse is usually used. It is only needed in special instances in which the transmission process involves removing the normal sync signals and replacing them in possibly a slightly different position so that the normal sync timing reference relative to the scrambled video is displaced. The output of adder 48 is a standard NTSC video format signal.

Synchronous counters 52 and 54 provide the address information for random access memories 38 and 40 respectively. Those counters are reset at the beginning of each input television line by the H pulse reference from pulse mono 32 and are clocked by clock generator 50. On any given input video line one of the two counters provides address information to the random access memory being loaded by the input video signal and the other synchronous counter provides address information to the random access memory which is providing the output video from the scrambler. If random access memory 38 is receiving the input video information, synchronous counter 52 is incremented continuously by the clock generator for the entire period. During this period the count of synchronous counter 54 however is jumped at several points to provide the addresses required to random access memory 40 in order to produce the line rotated signal to switch 42. Referring back to FIG. 1 the jump sequence required to transform the original line in FIG. 1A into the rotated line in FIG. 1B is as follows: When the count of synchronous counter 54 reaches 141 the count is jumped to a count of R. Then when the count reaches 877 the count is jumped to a count of 145 and finally when the count reaches R + 12 the count is jumped to 887. The counter then continues counting until reset by the next H reference pulse.

The output of the synchronous counter which is addressing the random access memory that is providing the output signal is selected by data selector 62 which is controlled by flip-flop 68. The output of data selector 62 then provides one input to comparator 70. The second input to the comparator is provided by data selector 80. The three inputs to data selector 80 are the counts at which a jump is to take place. These inputs are selected by a two-stage counter 84. At the beginning of an input television line counter 84 is reset by the H pulse. The outputs of the counter then selects count 1 from the data selector input, that is, a count of 141. This count is applied at input 2 of comparator 70. When the output from data selector 62 equals the output from data selector 80 comparator 70 provides a pulse to mono 72. The output of mono 72 drives delay mono 86 which steps or increments the two-stage counter 84 thus selecting the second input of data selector 80. The output of mono 72 is also applied to AND gates 64 and 66. These AND gates are gated by the outputs of flip-flop 68 such that only the AND gate connected to the counter driving the random access memory being read out is open and consequently only this AND gate passes a preset pulse to the synchronous counter. The data input which determines the count to which the synchronous counter is preset is supplied by data selector 78. This data selector is also controlled by two-stage counter 84 and consequently on the first preset the synchronous counter is set to a count of R. This count R is provided by read only memory 76, which is driven by counter 74. This counter 74 is incremented by each horizontal reference pulse from pulse mono 32 providing the next address to the read only memory and thus selecting the next value of R. The function of delay mono 86 which drives two-stage counter 84 is to delay the incrementing of the counter so that data selector 78 will be providing count R when the preset pulse is applied to the synchronous counter. When the delay is over, the two-stage counter 84 is incremented thus driving data selectors 78 and 80 to position 2. This causes the second input to comparator 70 to be a count of 877. When this count is reached the process is repeated and synchronous counter is preset to count 145 which is the second input to data selector 78. The third input to data selector 80, R + 12, is derived by adding 12 to the count R in adder 82. When this count is reached the synchronous counter is preset to 887 which is the last jump count for the line.

A write pulse is required by the random access memory which is storing the incoming video signal. This pulse is derived from the clock pulse generated by clock generator 50. The clock pulse is applied to delay 60 which provides a very short delay such that the synchronous counters can change to the next count before the write pulse is applied to the random access memories. The output of delay 60 is applied to AND gates 56 and 58, one of which is open and one closed, on each line as determined by flip-flop 68. The open AND gate provides an output pulse to the random access memory which is storing the input video on each clock pulse. The output of delay 60 also goes to digital-to-analog converter 44 and provides the synchronized clock pulse for the digital-to-analog conversion.

The output of the ROM address counter 74 is also applied as a parallel input to shift register 90. The ROM address count on line 17 of each even field is read out from shift register 90 and added to the output video signal by means of adder 48. This provides information to synchronize the ROM address counter in a receiver so that the randomly rotated lines can be unscrambled. Line 17 is ready to be read out of one of the random access memories when detector 16 detects input line 18. This is true because there is a one line delay as the video information is being rotated. The output of detector 16 opens AND gate 96. Delay mono 92 drives mono 94 which provides a 50 microsecond input pulse to AND gate 96. When this gate is open the 50 microsecond pulse enables a divide-by-16 counter 88 which provides clock pulses to shift register 90. The shift pulses are at a rate of 895 kilohertz and they clock out the ROM address which is provided to the adder 48.

Detector 98 detects a count of 136 from data selector 62. At this count it triggers mono 100 which provides a 0.4 microsecond cue pulse to adder 48. This cue pulse is added to the video just before the active line as explained previously.

During the vertical intervals the signal from flip-flop 30 is used to inhibit mono 72 and also mono 100. Consequently, there is no random rotation of lines during the vertical interval and no cue pulses are added.

Figure 5:
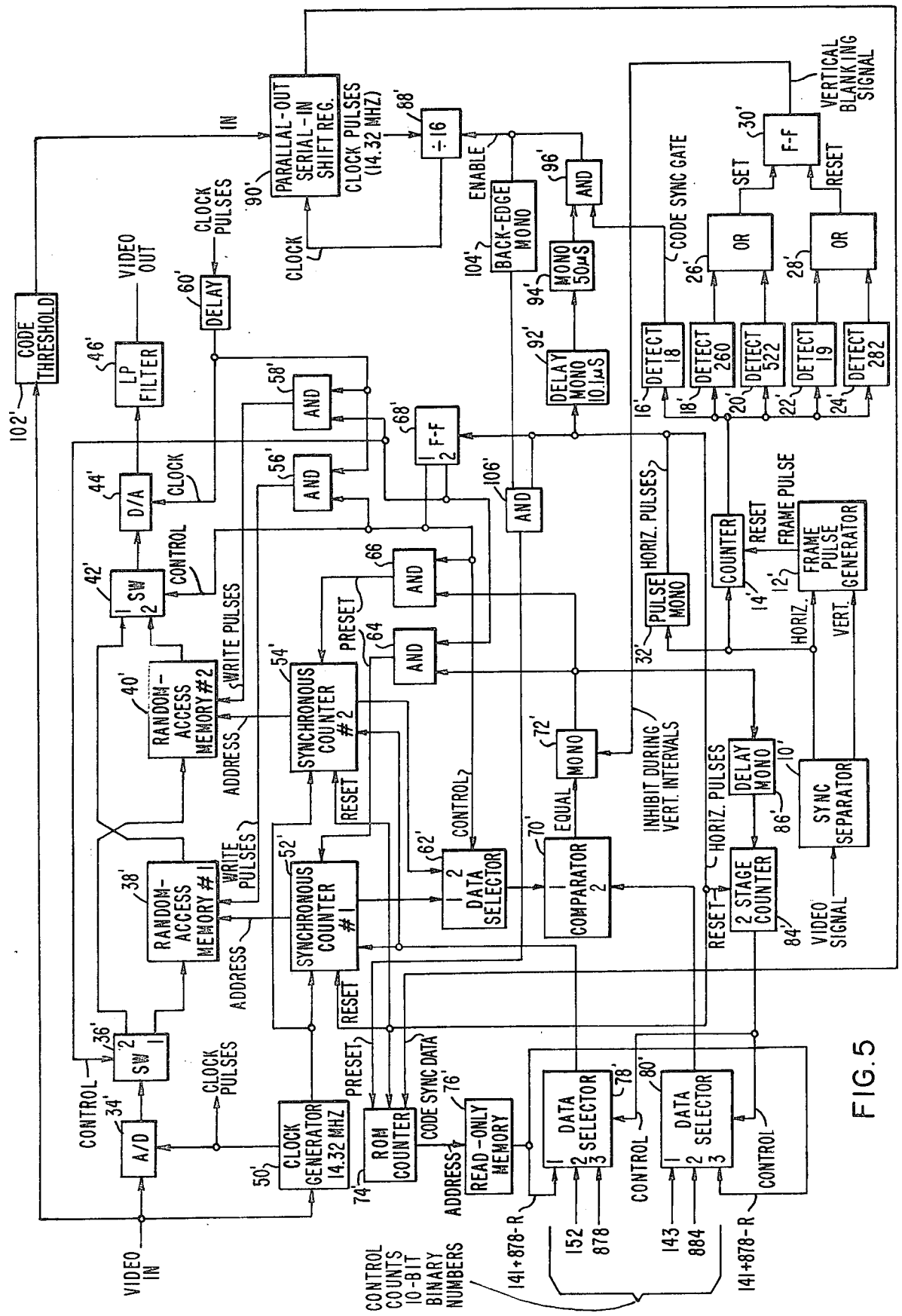
FIG. 5 is a block diagram of the decoding portion of the system.

FIG. 5 is a detailed block diagram of the descrambler corresponding to block 17 of FIG. 3. The basic operation of the descrambler is essentially identical to that of the scrambler and consequently the discussion of the operation will not be repeated. For ease of understanding the same reference numbers have been used to identify similar functions in FIGS. 4 and 5 except that a prime notation is used in FIG. 5 to indicate that the apparatus is part of the descrambler. It is also necesssary that the read only memory 76' provide a complementary count to the random count provided at the transmitter. For example, if the random count at a given address in the transmitter is R, the corresponding count at the descrambler is 141 plus 878 minus R. This count can be seen as the first input to data selector 78'. Another change is that adder 82 of FIG. 4 is not needed in FIG. 5 since no samples are repeated in the descrambling operation. Some of the other counts to the data selectors 78 and 80 are also altered slightly between FIGS. 4 and 5. This is to select the repeated samples at the end of the rotated line and to delete the corresponding samples at the beginning of the line as was explained previously.

The synchronization of the ROM address counter at the receiver is accomplished by detecting the binary sync code and utilizing this code to set the beginning count of the ROM address counter 74'. The input video is applied to a threshold device 102' which provides a binary output corresponding to the code sync data on input line 17. This line is detected by detector 16' which opens AND gate 96' providing the clock to divider 88' which in turn clocks the data serially into shift register 19'. When the output pulse from mono 94' is ended, back-edge mono 104' is triggered producing a pulse input to AND gate 106'. This opens AND gate 106' so the next H pulse corresponding to the beginning of line 18 arrives and an output pulse is provided to preset ROM counter 74'. The data input to the ROM counter is provided by the parallel output from shift register 90' which contains the code sync data provided by the transmitted signal.

It should be noted that delay mono 92' has a period of 10.1 microseconds in the receiver, rather than 9.5 microseconds as in the transmitter. This is to delay the clock pulses to the middle of the data bits on the code line.

Detector 98, mono 100 and adder 48 of FIG. 4 are not needed in the receiver and consequently do not appear on FIG. 5.

I claim:

1. Apparatus for scrambling a signal, said signal including a plurality of first lines with each first line comprising a synchronization portion followed in time by a first data portion, said data portion comprising at least sequentially occurring first and second data segments.
    1. data storage apparatus having first and second storage locations with each of said locations having sufficient storage capacity to store data representing at least one line of said signal;

2. storage control apparatus for alternately storing data representing selected lines of said signal;
3. read control apparatus for alternately reading said stored data from said first and second storage locations to produce a modified line corresponding to each of said first lines, each modified line consisting of a synchronization portion and third and fourth data segments sequentially following said synchronization portion; with
   a. said synchronization portion being substantially identical to the synchronization portion of the corresponding said first line;
   b. said third data segments being substantially identical to said second data segments;
   c. said fourth data segments being substantially identical to said first data segments; and
4. apparatus for randomly varying the length of said first and second data segments to produce said scrambled signal.

2. Apparatus for secure transmission and reception of a signal, said signal including a plurality of first lines with each first line comprising a synchronization portion followed in time by a first data portion, said data portion comprising at least sequentially occurring first and second data segments, comprising:
1. first data storage means having first and second storage locations with each location having sufficient storage capacity to store data representing at least one line of said signal;
2. control apparatus for alternately storing data representing selected lines of said signal in and alternately reading data representing selected lines of said signal from said first and second storage locations to produce modified lines corresponding to each of said first lines, each modified line consisting of a synchronization portion and third and fourth data segments sequentially following said synchronization portion; wherein
   a. said synchronization portion is substantially identical to the synchronization portion of the corresponding first line;
   b. said fourth data segment being substantially identical to said first data segment; and
3. apparatus for selectively varying the length of said first and second data segments to produce a scramble signal;
4. apparatus for transmitting said scrambled signal;
5. apparatus for receiving said scrambled signal and for alternately storing selected lines by said scrambled signal in second data storage means having first and second storage locations with each location having sufficient storage capacity to store data representing at least one line of said scrambled signal; and
6. read apparatus for alternately reading data from said first and second storage locations of said second data storage means to produce a second signal, said second signal being substantially identical to said first signal.

3. Apparatus for scrambling a signal, said signal including a plurality of first lines with each first line comprising a synchronization portion followed in time by a first data portion, said data portion comprising at least sequentially occurring first and second data segments.
1. data storage apparatus having first and second storage locations with each of said location having sufficient storage capacity to store data representing at least one line of said signal;
2. storage control apparatus for alternately storing data in and reading said stored data from said first and second storage locations to produce a modified line corresponding to each of said first lines, each modified line consisting of synchronization portion and a second data portion with,
   a. said synchronization portion being substantially identical to the synchronization portion of the corresponding said first line;
   b. said second data portion being substantially identical to said first data portion with said first and second data segments interchanged;
3. apparatus for varying the length of said first and second segments in predetermined manner to produce said scrambled signal.

* * * * *